United States Patent [19]

Kuper et al.

[11] Patent Number: 4,933,946
[45] Date of Patent: Jun. 12, 1990

[54] CONDUCTIVELY COOLED SOLID-STATE SLAB LASER

[75] Inventors: Jerry W. Kuper, Martinsville; William R. Rapoport, Bridgewater, both of N.J.

[73] Assignee: Allied-Signal Inc., Morris Township, Morris County, N.J.

[21] Appl. No.: 393,613

[22] Filed: Aug. 14, 1989

[51] Int. Cl.⁵ .............................................. H01S 3/04
[52] U.S. Cl. ...................................... 372/34; 372/66; 372/92
[58] Field of Search ...................... 372/34, 39, 66, 71, 372/72, 92, 97

[56] References Cited

U.S. PATENT DOCUMENTS

| | | | |
|---|---|---|---|
| 3,665,335 | 5/1972 | Tomiyasu . | |
| 4,468,774 | 8/1984 | Robbins . | |
| 4,509,175 | 4/1985 | Daly et al. | 372/92 |
| 4,525,842 | 6/1985 | Myers | 372/92 |
| 4,594,716 | 6/1986 | Guch, J. | 372/72 |
| 4,601,038 | 7/1986 | Guch, Jr. | 372/34 |
| 4,734,913 | 3/1988 | Morris et al. | 372/34 |
| 4,734,917 | 3/1988 | Johnson . | |
| 4,800,569 | 1/1989 | Azad . | |
| 4,802,186 | 1/1989 | Gibson et al. | 372/92 |
| 4,858,242 | 8/1989 | Kuper et al. | 372/34 |

Primary Examiner—Léon Scott, Jr.
Attorney, Agent, or Firm—Gerhard H. Fuchs; Richard C. Stewart; Ernest D. Buff

[57] ABSTRACT

A conductively cooled, optically face-pumped slab laser comprises a slab laser host 1 having transparent, thermally conductive pump lamp housings 2 bonded to its pump faces. Flashlamps 3 are embedded in pump lamp housings 2 for generating pumplight which is transmitted through the housings 2 into laser host 1 to cause lasing. Heat flow within the laser host 1 is substantially bi-directional, thereby minimizing optically harmful thermal distortion of the host. The apparatus can function as laser amplifier, laser oscillator or combined oscillator/amplifier.

9 Claims, 2 Drawing Sheets

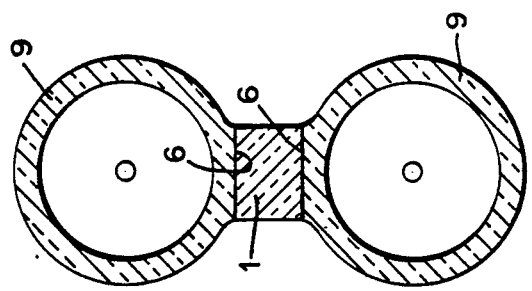
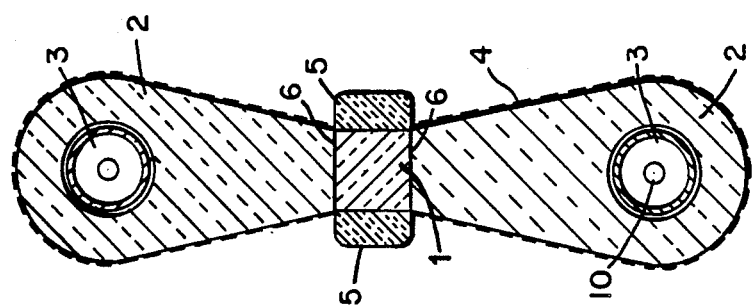
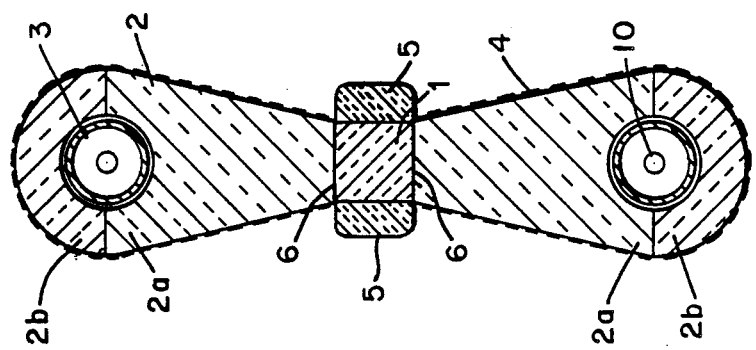

CONDUCTIVELY COOLED SOLID-STATE SLAB LASER

BACKGROUND OF THE INVENTION

1. Field of the Invention

This invention relates to an optically pumped, conductively cooled solid-state slab laser having transparent, thermally conductive solid pump lamp housings bonded to the pumped faces of the slab for bi-directional cooling of the lasing medium by conduction.

2. Description of the Prior Art

U.S. Pat. No. 4,734,913 to Morris et al. discloses a unitary solid state laser having a solid transparent housing with two cavities. A laser medium is embedded in one cavity and a pump lamp in the other. The housing completely surrounds the laser medium, so that cooling of the medium by the housing is omnidirectional.

Fluid cooled slab lasers are disclosed, for example, in U.S. Pat. Nos. 4,800,569 to Azad, 4,734,917 to Johnson, 4,468,774 to Robbins and 3,665,335 to Tomiyasu.

SUMMARY OF THE INVENTION

In accordance with the present invention, a conductively cooled, optically face-pumped slab laser apparatus comprises, in combination, (a) an elongated slab of active laser host having two opposite ends and a pair of parallel, optically plane faces extending along its length for receiving radiation for optical pumping of the host, and for acting as total internal reflective surfaces for creating internal optical paths; (b) first and second transparent, thermally conductive solid pump lamp housings, each having an optically plane face which is dimensioned to match and is bonded to an optically plane face of said laser host by means of a bonding agent, which bonding agent has a refractive index which is smaller than the refractive index of the laser host, said pump lamp housings having at least one cavity extending substantially parallel to said optically plane face for receiving pump lamps, said pump lamps housing further having a reflective coating for substantially preventing escape of the pump light from the housing except at the optically plane face which is bonded to said laser host; and (c) pump lamps embedded in the cavities of said pump lamp housings for exciting the laser host.

The laser apparatus of the present invention may function as a laser oscillator, a laser amplifier or a combined oscillator/amplifier. In the event the laser apparatus is to function as a laser oscillator, it will be provided with reflectors adjacent to the opposite ends of the laser host to define an optical resonant cavity to support coherent radiation emitted by the laser host, optionally along with multi-plexed amplifier passes.

Preferably, the laser host is alexandrite, emerald or Nd:YAG. The transparent, thermally conductive solid pump lamp housings are preferably sapphire. Desirably, the sides of the slab which are not bonded to the transparent, thermally conductive housings are thermally insulated from the surroundings.

In the conductively cooled, solid-state slab laser of the presently claimed construction, conductive cooling is essentially bi-directional, so that thermal gradients in the slab are predominantly contained in the plane formed by the slab and the pump lamps. This provides laser beam compensation for thermal lensing and distortion using the zigzag optical path. By the term "pump lamps embedded in the cavity of said pump lamp housing" we mean that the pump lamps, such as a flashlamp, are substantially surrounded by the housing on all sides, except possibly for the ends. Optionally, a pump lamp envelope and the pump lamp housing may be integrally formed, with the envelope so formed being provided with an optically plane face which is bonded to a pumped face of the laser host.

Further, either one or both of the pump lamp housings may optionally be provided with heat exchange means, such as internal passages for passing heat exchange fluid therethrough, external cooling fins, and the like. By such means it is possible to control the temperature of the apparatus in operation within desired limits, for purposes such as preventing damage due to overheating, or for operation within temperature ranges of optimal laser host performance, while at the same time maintaining the bi-directional heat flow within the lasing medium, with its attendant benefits.

Bonding between housing and slab may conveniently be effected using a bonding agent, particularly a thermally fusable bonding agent having high optical transmission in the pump region, such as glass frit.

The pump lamp may be any of the means commonly employed for exciting solid-state laser hosts, such as flashlamps. Flashlamps having a cerium-doped fused quartz envelope, such as those supplied by Heraeus Amersil under the designation M-382, are preferred. Optionally, a suitable filter material may be positioned between the pump means and the laser host for filtering out undesirable wavelength components generated by the pump means.

BRIEF DESCRIPTION OF THE DRAWINGS

In the annexed drawings, wherein like numerals denote like parts,

FIG. 3 is a transverse cross-sectional view of the apparatus of FIG. 2;

FIG. 4 is a transverse cross-sectional view of another embodiment of the apparatus of the type illustrated in FIG. 2;

FIG. 5 is a transverse cross-sectional view of apparatus of the present invention having integrally formed lamp envelope/pump lamp housings.

DETAILED DESCRIPTION OF THE INVENTION

Figure 1:
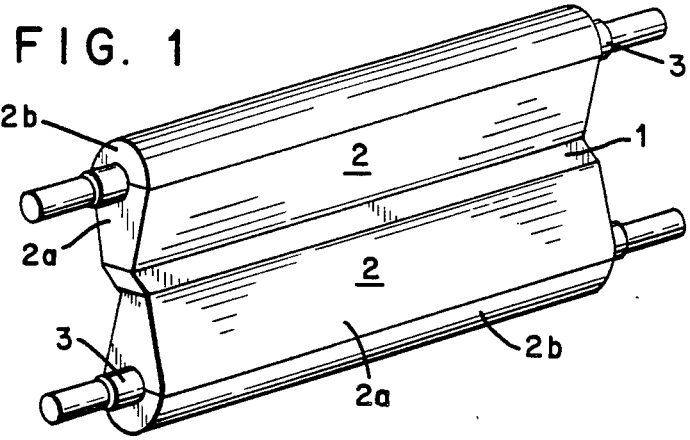
FIG. 1 is an isometric view of one embodiment of the conductively cooled slab laser apparatus of the present invention.
Figure 2:
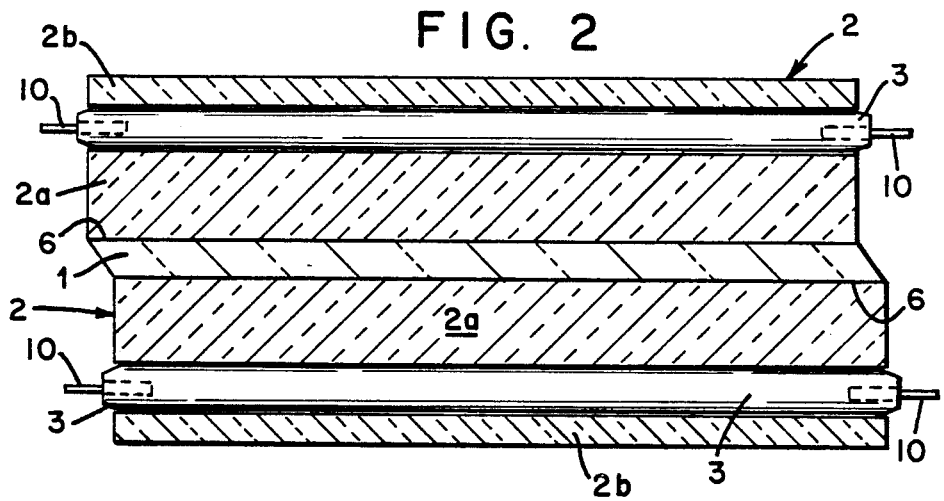
FIG. 2 is a view of the apparatus of FIG. 1 in longitudinal cross-section.

With reference to FIG. 1, the conductively cooled solid-state slab laser apparatus of the present invention comprises a slab laser host 1 having two opposites ends and a pair of parallel optically plane faces extending along its length. To the parallel, optically plane faces are bonded pump lamp housings 2 having a longitudinal bore parallel to the optically plane face of the slab laser host 1 Embedded in the bores of pump lamp housings 2 are a pair of pump lamps 3. The pump lamps 3 serve to excite the laser host 1 by providing light for optical pumping of laser host 1. As illustrated in FIGS. 1 and 2, pump lamp housings 2 may optionally be formed in sections 2a and 2b, which can be separated for easy insertion of the pump lamps 3.

FIG. 2 is a longitudinal cross-sectional view of the apparatus illustrated in FIG. 1. The pump lamps are illustrated by flashlamps 3 having electrodes 10. Pump lamp housings 2 are bonded to slab laser host 1 by means of bonding layer 6. Bonding layer 6 must have a refractive index that is smaller than the refractive index of the slab laser host, so that the total internal reflective bounces are greater than the critical angle, thereby providing that the optically plane faces extending along the length of slab laser host 1 act as total internal reflective surfaces for creating optical paths within the slab. Conveniently, the bonding agent (usually glass) which will form the bonding layer 6 is provided as a powder (frit). The bonding agent is positioned between the optically plane faces of the slab laser host 1 and pump lamp housing 2, followed by heating under clamping pressure to effect thermal fusion of the bonding agent and bonding of the mating surfaces. A convenient form of glass powder bonding agent is commercially available in the form of tape comprising glass powder held together by a binder; the binder evaporates or is destroyed in the thermal fusion step. Bonding agents further should have high optical transmission in the spectral region of interest, and relatively good match of thermal expansion coefficient. In addition, the bonding agent should have a melting point that is low enough that the agent can be melted (and solidified) without damaging the laser host or the pump lamp housing Also, the bonding agent should not deteriorate during exposure to the heat and radiation generated by the lamp. Low melting glasses, certain polymers such as silicon elastomers and other similar materials well known in the art are suitable bonding agents. Care should be taken in bonding the slab laser host to the pump lamp housing to avoid introduction of bubbles or other inhomogeneities.

FIG. 3 is a transverse cross-sectional view of apparatus of the type illustrated by FIG. 1 showing the slab laser host 1 to which there are bonded pump lamp housings 2 which are formed as sections 2a and 2b. Pump lamps 3 having electrodes 10 are embedded in pump lamp housings 2. Between slab laser host 1 and pump lamp housings 2 a bonding layer 6 is provided. In addition, the free sides of slab laser host 1 are thermally insulated from the surrounding environment by means of insulating strips 5. The insulating strips 5 aid in providing bi-directional conductive heat flow from laser host 1 to pump lamp housings 2 in the plane formed by the slab and the flashlamps, to thereby provide laser beam compensation for thermal lensing and distortion of the laser host 1. Pump lamp housings 2 are further provided with a reflective coating 4. Reflective coating 4 substantially prevents escape of pump lamp light from the housing except at the optically plane face which is bonded to the laser host (and except possibly at the ends, if uncoated), thereby greatly enhancing the efficiency of utilization of the pump light. Silver or gold are preferred reflector media. In addition, depending on the emission characteristics of the pump lamp and the absorption characteristics of the laser host, it may be advantageous that the pump lamp envelope have a filter coating (not shown) to eliminate unwanted spectral components of the lamp output. A suitably chosen coating will reflect back into the lamp those wavelengths (infrared and ultraviolet, for example) that do not efficiently excite the laser rod. Furthermore, elimination of the ultraviolet component can prevent solarization of the laser rod. Alternatively, especially if the laser host is alexandrite, the pump lamp may be provided with an envelope having a cerium-doped fused quartz envelope, which perform comparable to coated flashlamps carrying UV and IR reflective coatings. Such lamps are commercially available. Optionally, the pump lamp envelope may be bonded to the bore of pump lamp housing 2. This, however, will not ordinarily be desirable because of resultant difficulties in replacing the pump lamp.

FIG. 4 is a transverse cross-sectional view of laser apparatus of the type illustrated in FIG. 1, except that pump lamp housings 2 are not formed sectionally so that pump lamps 3 having electrodes 10 must be inserted into the bore by sliding them into the bore. Otherwise, the apparatus of FIG. 4 is identical to that illustrated in FIG. 3.

FIG. 5 is a further transverse cross-sectional view of such apparatus wherein the lamp envelope and pump lamp housing are integrally formed as a unit. Lamp envelope 9 is provided with an optically plane face extending along its length which is bonded by means of bonding agent 6 to slab laser host 1.

Figure 6:
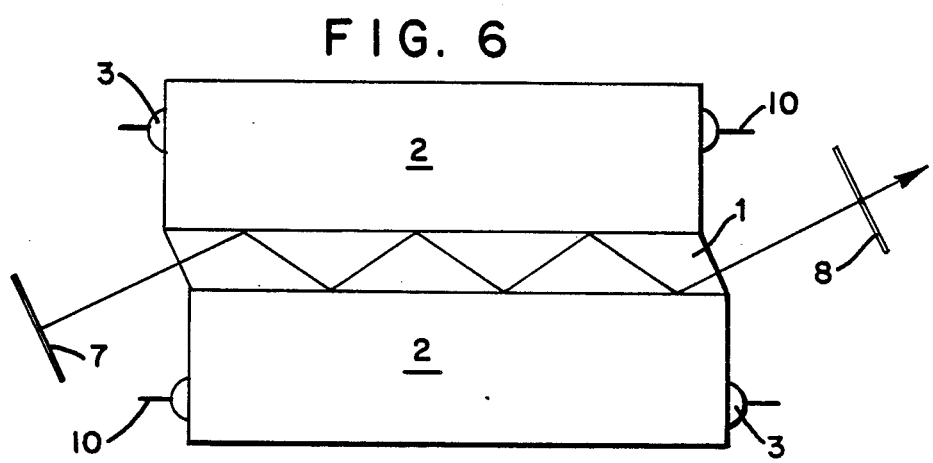
FIG. 6 is a schematic view of laser apparatus of the present invention having reflector means adjacent to the opposite ends of the laser host that define an optical resonant cavity and support coherent radiation emitted by the laser host.

The conductively cooled slab laser apparatus of the present invention may be operated as a laser amplifier, as a laser oscillator, as well as a combined laser amplifier/oscillator. In the event it is to be used as a laser amplifier, reflecting means for establishing a lasing cavity for oscillation need not be provided. However, in the event that the apparatus is to be used as a laser oscillator, as schematically illustrated in FIG. 6, it will be necessary to provide reflecting means for defining a lasing cavity, as is illustrated in FIG. 6, by providing a total reflector 7 and a partial reflector 8 at opposite ends of slab laser host 1.

The laser host may be any solid material capable of supporting lasing action. Illustrative materials include alexandrite, emerald, Nd:YAG, Nd:BEL, Ti-Sapphire, and the like. Since during operation the laser host, pump lamp housing and pump lamp all heat up, it is preferred to utilize laser media, like alexandrite and emerald, whose output efficiency is not diminished at elevated temperatures.

An important criterion for the choice of material of construction for the pump lamp housing is that it transmits in the wavelength region of the laser pump bands. Typical of materials that are suitable are certain glasses, fused silica, quartz, chrysoberyl and sapphire. Sapphire and fused silica are preferred, because they are suitable and readily available commercially. Sapphire is a preferred housing material because of its superior thermal shock resistance. Glass moldings are also suitable. The relevant parameters that guide the choice of materials in a particular instance, e.g., transmission spectra, thermal conductivity, thermal expansion coefficients and index of refraction are tabulated in reference works, such as The American Institute of Physics Handbook, published by McGraw-Hill.

Since various changes may be made in the invention without departing from its spirit and essential characteristics it is intended that all matter contained in the description shall be interpreted as a illustrative only and not in a limiting sense, the scope of the invention being defined by the appended claims.

We claim:

1. A conductively cooled, optically face-pumped slab laser apparatus comprising, in combination:
   (a) an elongated slab of active laser host having two opposite ends and a pair of parallel, optically plane faces extending along its length for receiving radiation for optical pumping of the host, and for acting as total internal reflective surfaces for creating internal optical paths;
   (b) first and second transparent, thermally conductive solid pump lamp housings, each having an optically plane face which is dimensioned to cover and is bonded to a Parallel optically plane face of said laser host by means of a bonding agent having a refractive index which is smaller than the refractive index of the laser host, said pump lamp housings having at least one cavity extending substantially parallel to said optically plane face for receiving a pump lamp, said pump lamp housings further having a reflective coating for substantially preventing escape of the pump lamp light from the housing except at the optically plane face which is bonded to said laser host; and
   (c) pump lamps embedded in the cavity of said pump lamp housings, for exciting the laser host.

2. The apparatus of claim 1, wherein said pump lamps comprise flashlamps.

3. The apparatus of claim 2, wherein said laser host is selected from the group consisting of alexandrite, emerald and Nd:YAG.

4. The apparatus of claim 3, wherein the material of construction of said solid pump lamp housings is selected from the group consisting of fused silica and sapphire.

5. The apparatus of claim 1 further provided with thermal insulating means covering the free side surfaces of the elongated slab of said laser host.

6. The apparatus of claim 5, wherein said pump lamp comprises a flashlamp, wherein said laser host is selected from the group consisting of alexandrite, emerald and Nd:YAG, and wherein the material of construction of said pump lamp housing is selected from the group consisting of sapphire and fused silica.

7. The apparatus of claim 5, wherein said pump lamp comprises a flashlamp, wherein said laser host is alexandrite, wherein said pump lamp housing is made of sapphire, and which is further provided with filter means between said flashlamp and laser host for filtering out unwanted components of the lamp output.

8. The apparatus of claim 5, wherein said pump lamp comprises a flashlamp having a cerium-doped fused quartz envelope, wherein said laser host is selected from the group consisting of alexandrite, emerald and Nd:YAG, and wherein said pump lamp housing is made of sapphire.

9. The apparatus of claim 8, wherein said laser host is alexandrite.

* * * * *